United States Patent
Benslama et al.

(10) Patent No.: US 10,746,050 B2
(45) Date of Patent: Aug. 18, 2020

(54) VARIABLE STIFFNESS BEARING SUSPENSION DEVICE

(71) Applicant: Safran Aircraft Engines, Paris (FR)

(72) Inventors: Yanis Benslama, Moissy-Cramayel (FR); Serge Benyamin, Moissy-Cramayel (FR); Alexandre Jean-Marie Tan-Kim, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/226,027

(22) Filed: Dec. 19, 2018

(65) Prior Publication Data

US 2019/0195090 A1 Jun. 27, 2019

(30) Foreign Application Priority Data

Dec. 21, 2017 (FR) ...................... 17 62885

(51) Int. Cl.
*F01D 25/16* (2006.01)
*F02C 7/06* (2006.01)
(Continued)

(52) U.S. Cl.
CPC .............. *F01D 25/164* (2013.01); *F02C 7/06* (2013.01); *F16C 19/527* (2013.01); *F16C 27/04* (2013.01);
(Continued)

(58) Field of Classification Search
CPC ........ F16C 25/04; F16C 25/06; F16C 27/066; F16C 2360/23; F16C 2360/24;
(Continued)

(56) References Cited

U.S. PATENT DOCUMENTS 3,473,853 A * 10/1969 Bill ...................... F01D 25/164
384/535
3,743,059 A * 7/1973 Morse ...................... F16F 3/12
188/268
(Continued)

FOREIGN PATENT DOCUMENTS

DE 10258528 A1 7/2004
FR 2864995 A1 7/2005
(Continued)

OTHER PUBLICATIONS

INPI Search Report and Opinion for corresponding French patent application FR 1762885 dated Sep. 13, 2018 (6 pages).

*Primary Examiner* — Marcus Charles
(74) *Attorney, Agent, or Firm* — Bookoff McAndrews, PLLC

(57) ABSTRACT

A bearing suspension device includes first and second elastically flexible members extending in an axial direction; and first and second thrust points that are movable in the axial direction and that are in radial contact respectively with the first and second elastically flexible members. The bearing suspension device is configured to transmit a radial force by the first elastically flexible member bending between the first thrust point and a first end of the first elastically flexible member, and also to transmit the radial force by the second elastically flexible member bending between the second thrust point and a first end of the second elastically flexible member.

9 Claims, 2 Drawing Sheets

(51) Int. Cl.
*F16C 25/06* (2006.01)
*F16C 19/26* (2006.01)
*F16C 19/52* (2006.01)
*F16C 35/07* (2006.01)
*F16C 27/04* (2006.01)
*F16C 35/077* (2006.01)
*F16C 27/06* (2006.01)

(52) U.S. Cl.
CPC ........ *F16C 35/077* (2013.01); *F05D 2240/50* (2013.01); *F05D 2260/96* (2013.01); *F16C 19/26* (2013.01); *F16C 19/522* (2013.01); *F16C 25/06* (2013.01); *F16C 27/045* (2013.01); *F16C 27/066* (2013.01); *F16C 2233/00* (2013.01); *F16C 2360/23* (2013.01)

(58) Field of Classification Search
CPC ...... F16C 19/26; F16C 19/522; F16C 19/527; F16C 27/04; F16C 35/077; F16C 2233/00; F02C 7/06; F01D 25/164; F05D 2240/50; F05D 2260/96
USPC ................ 384/192, 215, 456, 535, 519, 556
See application file for complete search history.

(56) References Cited

U.S. PATENT DOCUMENTS

| | | | | |
|---|---|---|---|---|
| 3,961,829 | A * | 6/1976 | Bowen | F16C 27/066 384/536 |
| 4,496,252 | A * | 1/1985 | Horler | C23C 16/45504 384/215 |
| 4,500,143 | A * | 2/1985 | Kervistin | F01D 25/16 184/6.11 |
| 4,968,158 | A * | 11/1990 | Atkinson | F01D 25/164 384/476 |
| 4,971,457 | A * | 11/1990 | Carlson | F01D 25/164 384/581 |
| 6,098,399 | A | 8/2000 | Richards et al. | |
| 6,296,394 | B1 * | 10/2001 | Braun | F16C 23/08 384/535 |
| 9,388,852 | B2 * | 7/2016 | Bedenk | F16C 27/04 |
| 2005/0152626 | A1 * | 7/2005 | Gerez | F01D 21/045 384/99 |
| 2006/0097589 | A1 | 5/2006 | Gerez et al. | |
| 2009/0110543 | A1 | 4/2009 | Alam et al. | |
| 2012/0328431 | A1 * | 12/2012 | Davis | F01D 25/164 415/229 |
| 2013/0089409 | A1 * | 4/2013 | Bedrine | B64C 27/12 415/122.1 |
| 2014/0060083 | A1 | 3/2014 | Savela | |
| 2017/0218766 | A1 | 8/2017 | Amano | |

FOREIGN PATENT DOCUMENTS

| | | |
|---|---|---|
| FR | 2955615 A1 | 7/2011 |
| FR | 3013760 A1 | 5/2015 |
| GB | 2320526 A | 6/1998 |
| RU | 2623703 C1 | 6/2017 |

* cited by examiner

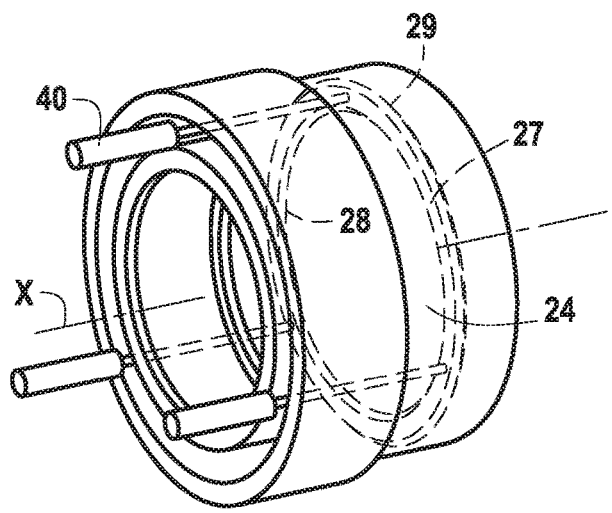
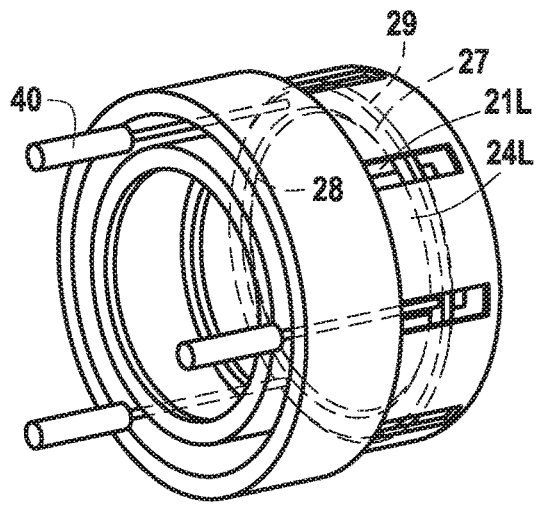
FIG.3    FIG.4
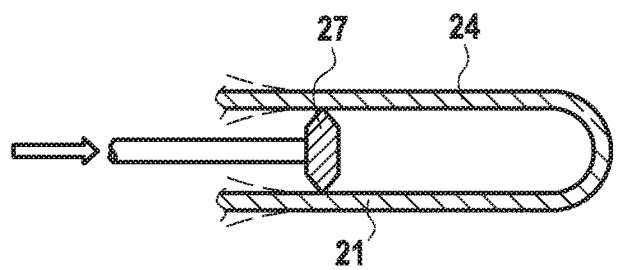
FIG.5A
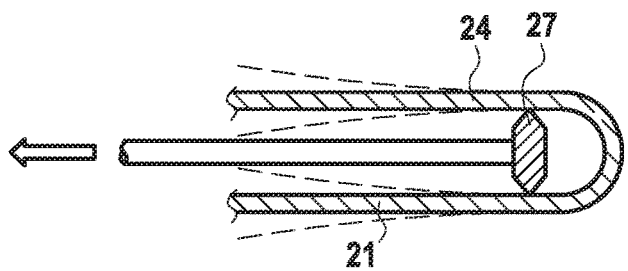
FIG.5B

VARIABLE STIFFNESS BEARING SUSPENSION DEVICE

CROSS-REFERENCE TO RELATED APPLICATION

This application claims priority to French Patent Application No. 1762885, filed Dec. 21, 2017.

BACKGROUND OF THE INVENTION

The present disclosure relates to a bearing suspension device, and more particularly to a bearing suspension device of variable radial stiffness.

In a rotary machine, a rotary shaft is typically supported by one or more bearings, which, by way of non-exclusive example, may be rolling bearings, oil bearings, or gas bearings. The lifetime of such bearings is strongly dependent on the vibratory characteristics of the rotary machine. Manufacturing imperfections and other parasitic effects can generate unbalances and thus radial vibration acting on the bearings. It is therefore common practice to use devices for absorbing such vibration, at least in part. Thus, in the specification of French patent application published under the No. FR 3 013 760 A1, a device is disclosed that comprises a flexible cage arranged between an outer ring of the bearing and a support for the bearing.

Nevertheless, in such a rotary machine, and in particular in a rotary machine having a rotary shaft that is quite long, such as for example in certain turbomachines, it is possible to encounter resonant phenomena in bending, and in particular the so-called "forward" and "backward" resonant bending modes. Also, in order to be able to cross through such resonant modes without endangering the physical integrity of the rotary machine, bearing suspension devices having variable characteristics have already been proposed. Thus, by way of example, in FR 2 864 995 and FR 2 955 615, two suspension devices are disclosed that have radial stiffnesses that are variable. A temporary change in the radial stiffness of the suspension device of a bearing can thus serve to modify the dynamic response of the rotary machine in transient manner in order to avoid a resonant mode. Nevertheless, those disclosed devices are limited to only two alternative radial stiffnesses.

OBJECT AND SUMMARY OF THE INVENTION

The present disclosure relates to a bearing suspension device of stiffness that is variable in continuous manner over a wide range of values, both in order to increase stiffness and also in order to decrease stiffness. For this purpose, in at least a first aspect, this bearing suspension device may comprise first and second elastically flexible members extending in an axial direction, and first and second thrust points that are movable in the axial direction and that are in radial contact respectively with the first and second elastically flexible members. The bearing suspension device may then be configured to transmit a radial force by the first elastically flexible member bending between the first thrust point and a first end of the first elastically flexible member, and also to transmit the radial force by the second elastically flexible member bending between the second thrust point and a first end of the second elastically flexible member, and the first and second elastically flexible members being connected together by respective second ends.

Thus, in this bearing suspension device, moving the thrust points in the axial direction serves to increase or decrease gradually the axial length of the cantilever between the first and second bearing points and the first ends of the first and second elastically flexible members, thereby varying the stiffness of the device in response to the radial force transmitted between those members. It is also possible to increase substantially the range of values over which the radial stiffness of the bearing suspension device can be caused to vary, while occupying limited space, in particular in the axial direction. The first and second thrust points may be formed on a common movable element, which may in particular be annular in order to provide radial contact all around its perimeter.

In a second aspect, in order to make it easier to adjust radial stiffness, even and above all during rotation of a rotary shaft suspended in a bearing associated with the bearing suspension device, the device may further comprise an actuator for moving the first thrust point in the axial direction. The actuator may in particular be a hydraulic actuator, however other types of actuator, in particular electrical or pneumatic actuators may also be envisaged.

In a third aspect, in order also to distribute its load over its entire perimeter, the first elastically flexible member may be tubular. If the bearing suspension device also has a second elastically flexible member that extends in the axial direction, that member may likewise be tubular and coaxial.

Nevertheless, as an alternative, in a fourth aspect, the first elastically flexible member may comprise a plurality of axial tongues that are arranged over a circumference about a central axis. If the bearing suspension device also has a second elastically flexible member that extends in the axial direction, it may likewise comprise a plurality of axial tongues arranged over a coaxial circumference. It is also possible to envisage that one of the first and second elastically flexible members is tubular while the other one comprises a plurality of axial tongues arranged over a coaxial circumference.

The present disclosure also provides a rotary machine, particularly but not exclusively a turbomachine, including a rotary shaft, a bearing supporting the rotary shaft, a bearing support, and a bearing suspension device for suspending the above-mentioned bearing and interposed between the bearing and the bearing support. Nevertheless, it is likewise possible to envisage interposing the bearing suspension device between the bearing and the rotary shaft.

The present disclosure also provides a method of varying the radial stiffness of a bearing suspension device, in which a radial force may be transmitted by a bending moment via a first elastically flexible member between a first thrust point and a first end of the first elastically flexible member, and by a bending moment via a second elastically flexible member between a second thrust point and a first end of the second elastically flexible member, the first and second elastically flexible members being connected together by respective second ends. The method may in particular comprise a step of moving the first and second thrust points in the axial direction in order to vary the axial lengths of the cantilevers between the first thrust point and the first end of the first elastically flexible member, and between the second thrust point and the first end of the second elastically flexible member, and thus vary the stiffness of the bearing suspension device in response to a radial load.

BRIEF DESCRIPTION OF THE DRAWINGS

The invention can be well understood and its advantages appear better on reading the following detailed description of an embodiment shown by way of non-limiting example. The description refers to the accompanying drawings, in which:

FIG. 3 is a perspective view of the FIG. 2 bearing suspension device;

FIG. 4 is a perspective view of a bearing suspension device in an alternative embodiment; and FIGS. 5A and 5B are diagrams showing how the radial stiffness of each of the bearing suspension devices of FIGS. 2 and 4 can be caused to vary.

DETAILED DESCRIPTION OF THE INVENTION

Figure 1:
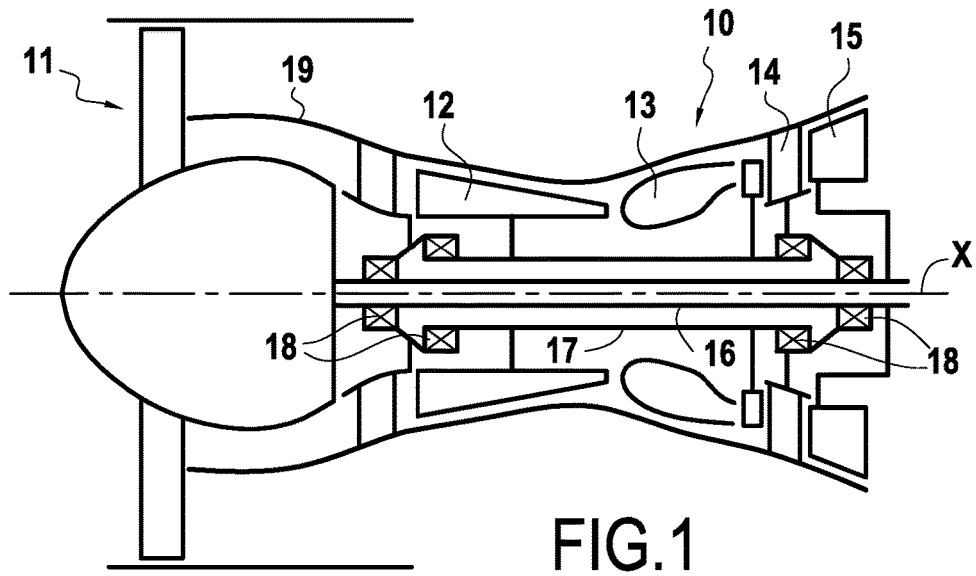
FIG. 1 is a diagrammatic view of a rotary machine suitable for incorporating a bearing suspension device.

FIG. 1 is a diagram showing a turbomachine 10 that is suitable for including a bearing suspension device in accordance with the present disclosure. In this context, the term "turbomachine" is used to designate any machine in which energy can be transferred between a fluid flow and at least one set of blades, such as for example a compressor, a pump, a turbine, a propeller, or indeed a combination of at least two of these, and in particular a gas turbine engine. In the example shown, the turbomachine 10 is such a gas turbine engine, more specifically a bypass turbojet or "turbofan" that comprises a fan 11, a compressor 12, a combustion chamber 13, a first turbine 14, and a second turbine 15 that are arranged in succession in the direction M that air and combustion gas flow through. The bearing suspension device of the present invention can nevertheless also be applied to other types of gas turbine engine, such as turbojets, turboprops, turboshaft engines, and other types of turbomachine and rotary machine.

In the turbomachine 10, the fan 11 is coupled to rotate with the second turbine 15, and the compressor 12 is coupled to rotate with the first turbine 14, respectively by first and second rotary shafts 16 and 17 that are coaxial. These coaxial rotary shafts 16 and 17 are supported in a casing 19 of the turbomachine 10 by corresponding bearings 18. For reasons of efficiency and of weight, the lengths of rotary shafts 16, 17 between the bearings 18 may be such that while the turbomachine 10 is in operation and before it reaches a maximum speed, one and/or the other of the first and second coaxial rotary shafts 16 and 17 reaches at least a first forward and/or backward resonant bending mode.

In order to be able, temporarily, to pass through a speed corresponding to such a resonant mode of one or the other of the rotary shafts 16, 17, a variable stiffness suspension device 20 may be interposed between at least one bearing 18 and a bearing support 30, or between the bearing 18 and the rotary shaft 16, 17. Varying the stiffness of the suspension device 20 then makes it possible to modify the resonant modes of the rotary shafts 16, 17, at least temporarily, so as to prevent them coinciding with the instantaneous speed of the turbomachine 10.

Figure 2:
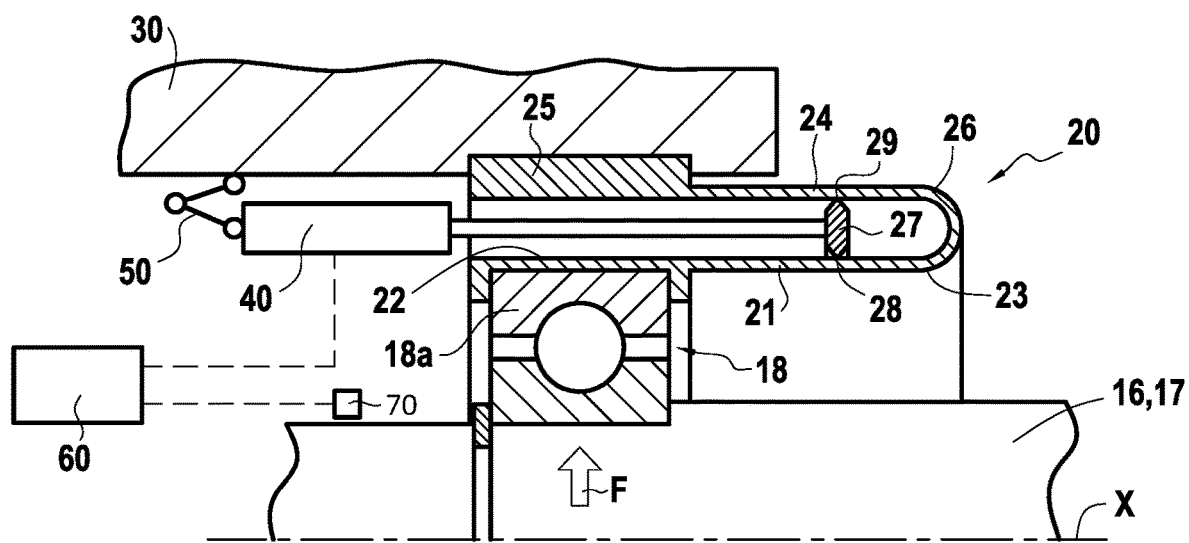
FIG. 2 is an axial section view of a bearing suspension device in a first embodiment that is interposed between a bearing and a bearing support.

FIG. 2 is a diagram showing an embodiment of such a suspension device 20 for suspending a bearing 18 in a bearing support 30. The suspension device 20 is annular in shape, being interposed radially between an outer ring 18a of the bearing 18, which may be a rolling bearing, and the bearing support 30, which may be secured to the casing 19 of the turbomachine 10.

More specifically, the suspension device 20 may be configured as a flexible cage, having a first elastically flexible member 21 extending in the axial direction, i.e. parallel to the central axis X of the bearing 18, from a first end 22 in radial contact with the bearing 18 and more specifically with the outer ring 18a of the bearing 18, towards a second end 23, and a second elastically flexible member 24 also extending axially from a first end 25 in radial contact with the bearing support 30 towards a second end 26 that is connected to the second end 23 of the first elastically flexible member 21. Thus, a radial force F can be transmitted between the bearing 18 and the bearing support 30 by the first and second elastically flexible members 21 and 24 bending.

In order to enable the radial stiffness of the suspension device 20 to be varied, it can include a movable element 27 having thrust points 28 and 29 in radial contact respectively with the first and second elastically flexible members 21 and 24. Thus, the radial force F can be transmitted between the first and second members 21 and 24 via the movable element 27 off-loading the first and second members 21 and 24 between the thrust points 28 and 29 and their respective second ends 23 and 26. Moving the movable element 27 in the axial direction thus serves to vary the radial stiffness of the suspension device 20 by increasing or decreasing the lengths of the cantilevers via which the radial force F is transmitted by the first and second members 21 bending between their first ends 22 and 25 and the respective thrust points 28 and 29.

Given the annular shape of the suspension device 20, the movable element 27 may likewise be annular, as shown in FIG. 3. In order to move it in the axial direction, it may be connected to an actuator 40, or indeed to a plurality of actuators 40 distributed over a circumference around the central axis X of the bearing 18, as shown in FIG. 3. Each of these actuators 40 may in particular be a hydraulic actuator, suitable for being fed with hydraulic fluid under pressure via a hydraulic circuit of the turbomachine 10, for example. Nevertheless, other types of actuator, e.g. electrical or pneumatic actuators, could equally well be envisaged. When a plurality of actuators 40 are connected to the movable element 27 in order to move it in the axial direction, they may be coupled, e.g. by mechanical means, so as to avoid unequal movement of the movable element 27.

In addition, each actuator 40 may be supported by the bearing support 30 via a connection 50 suitable for transmitting an axial force, but not allowing relative radial movement, so as to accommodate radial pulsation of the bearing 18. As in the example shown, this connection may be in the form of a spherical thrust bearing, but alternative forms could equally well be envisaged.

As also shown in FIG. 2, each actuator 40 may be connected to a control unit 60 that is also connected to a sensor 70 in order to sense the speed of rotation of the rotary shaft carried by the bearing 18. The control unit 60, which may in particular be an electronic computer, may be configured or programmed to control each actuator 40 so as to move the movable element 27 in the axial direction, thereby varying the radial stiffness of the suspension device 20, in particular when the rotary shaft carried by the bearing 18 is approaching a speed of rotation that has been identified, by prior calculation and/or testing, as corresponding to a resonant mode of the rotary shaft 16, 17, which speed may optionally be stored in a memory of the control unit 60.

As shown in FIG. 3, the first and second elastically flexible members 21 and 24 may be tubular. Under such circumstances, the thrust points 28 and 29 may form coaxial circumferences around the central axis X. Nevertheless, it is equally possible to envisage that at least one of the first and second elastically flexible members 21 and 24, or indeed both of them as shown in FIG. 4, comprises a plurality of axial tongues 21L, 24L that are arranged over a circumference around the central axis X, with radial openings between them. Under such circumstances, the movable element 27 may contact the first and second members 21 and 24 via at least one thrust point 28, 29 per axial tongue 21L, 24L.

After the speeds of rotation that correspond to resonant modes of the rotary shaft carried by the bearing 18 have been identified, by calculation and/or by testing, these speeds of rotation may be stored in a memory of the control unit 60. Thus, in operation, when the speed sensed by the sensor 70 approaches such a speed of rotation stored in the memory of the control unit 60 as corresponding to a resonant mode of the rotary shaft carried by the bearing 18, the control unit 60 may vary the radial stiffness of the suspension device 20 in accordance with any of the embodiments shown by using the actuator(s) 40 to cause the movable element 27 to move in the axial direction. The thrust points 28 and 29 in radial contact with the first and second members 21 and 24 then move radially with the movable element 27, as shown in FIGS. 5A and 5B, so that the lengths of the cantilevers via which the radial force F is transmitted by the first and second members 21 bending between their first ends 22 and 25 and the respective thrust points 28 and 29 thus become longer or shorter so as to give rise to radial stiffnesses that are respectively smaller or greater. By varying this stiffness in this way, it is thus possible, at least temporarily, to modify the dynamic response of the rotary shaft carried by the bearing 18 so as to avoid and/or cross through the resonant mode.

Although in each of the embodiments shown, the bearing suspension device has two coaxial elastically flexible members, with corresponding movable thrust points, it is also possible to envisage having only one elastically flexible member extending in the axial direction, with a thrust point that is movable axially in order to adjust the radial stiffness.

Furthermore, these bearing suspension devices may also be combined with a damper device, e.g. a damper having a thin layer of oil interposed between the bearing suspension device and the bearing and/or between the bearing suspension device and the bearing support. Naturally, if the bearing suspension device is interposed between the bearing and the rotary shaft, then the damper device could be interposed between the bearing and the bearing suspension device and/or between the bearing suspension device and the rotary shaft. By way of example, the damper device could alternatively be integrated in the bearing suspension device, e.g. inside the movable element that presents at least one thrust point in radial contact with an elastically flexible member.

Although the present invention is described with reference to specific embodiments, it is clear that various modifications and changes could be undertaken on those embodiments without going beyond the general ambit of the invention as defined by the claims. In particular, individual characteristics of the various embodiments mentioned may be combined in additional embodiments. Consequently, the description and the drawings should be considered in a sense that is illustrative rather than restrictive.

What is claimed is:

1. A bearing suspension device comprising:
   a first elastically flexible, member extending in an axial direction;
   a second elastically flexible member extending in the axial direction;
   a first thrust point that is movable in the axial direction, and that is in radial contact with the first elastically flexible member; and
   a second thrust point that is movable in the axial direction and that is in radial contact with the second elastically flexible member;
   the bearing suspension device being configured to transmit a radial force by the first elastically flexible member bending between the first thrust point and a first end of the first elastically flexible member, and also to transmit the radial force by the second elastically flexible member bending between the second thrust point and a first end of the second elastically flexible member, and the first elastically flexible member and the second elastically flexible member being connected together by respective second ends.

2. The bearing suspension device according to claim 1, further comprising an actuator for moving the first thrust point and the second thrust point in the axial direction.

3. The bearing suspension device according to claim 2, wherein said actuator is a hydraulic actuator.

4. The bearing suspension device according to claim 1, wherein the first thrust point and the second thrust point are formed on a common movable element.

5. The bearing suspension device according to claim 4, wherein the movable element is annular.

6. The bearing suspension device according to claim 1, wherein the first elastically flexible member is tubular.

7. The bearing suspension device according to claim 1, wherein the first elastically flexible member comprises a plurality of axial tongues arranged over a circumference around a central axis.

8. A turbomachine comprising:
   a rotary shaft;
   a bearing supporting the rotary shaft;
   a bearing support; and
   the bearing suspension device according to claim 1 interposed between the bearing and the bearing support.

9. A method of varying the radial stiffness of a bearing suspension device, in which a radial force is transmitted by a bending moment via a first elastically flexible member between a first thrust point and a first end of the first elastically flexible member, and by a bending moment via a second elastically flexible member between a second thrust point and a first end of the second elastically flexible member, the first elastically flexible member and the second elastically flexible member being connected together by respective second ends, the method comprising a step of moving the first thrust point and the second thrust point in the axial direction.

* * * * *